United States Patent [19]

Brohammer

[11] Patent Number: 4,867,618
[45] Date of Patent: Sep. 19, 1989

[54] REMOVABLE SPINDLE FOR DRILL HEADS

[76] Inventor: Lawrence F. Brohammer, 5078 Longview, Troy, Mich. 48098

[21] Appl. No.: 200,634

[22] Filed: May 31, 1988

[51] Int. Cl.⁴ .................. B23B 39/22; B23B 41/00
[52] U.S. Cl. ............................... 408/39; 408/59; 409/136; 409/231
[58] Field of Search ............ 408/37, 39, 53, 56, 408/57, 59; 409/135, 136, 230–232; 51/266

[56] References Cited

U.S. PATENT DOCUMENTS

| 2,012,047 | 8/1935 | Johnson | 408/53 X |
|---|---|---|---|
| 2,437,605 | 3/1948 | Karge | 408/56 |
| 2,703,994 | 3/1955 | Mezey | 408/37 |
| 2,884,818 | 5/1959 | Speckin et al. | 408/53 |
| 3,090,412 | 5/1963 | Conrad | 408/39 |
| 3,461,615 | 8/1969 | Ferguson et al. | 51/81 |
| 3,555,963 | 1/1971 | Evans | 29/26 |
| 3,568,367 | 3/1971 | Myers | 408/37 X |
| 3,765,787 | 10/1973 | Hart et al. | 408/53 |
| 3,828,479 | 8/1974 | Highberg et al. | 408/53 |
| 4,280,775 | 7/1981 | Wood | 408/3 |
| 4,365,916 | 12/1982 | Miyakawa | 408/46 |
| 4,579,483 | 4/1986 | Padovani | 408/39 |

Primary Examiner—Steven C. Bishop
Attorney, Agent, or Firm—Harness, Dickey & Pierce

[57] ABSTRACT

The present invention relates to a drill head having removable spindles. The spindles include a shaft adapted for receiving and rotating a drill. The shaft is also removably rotatable with the drilling unit. A mechanism for providing a coolant to the workpiece is coupled with the spindle.

14 Claims, 3 Drawing Sheets

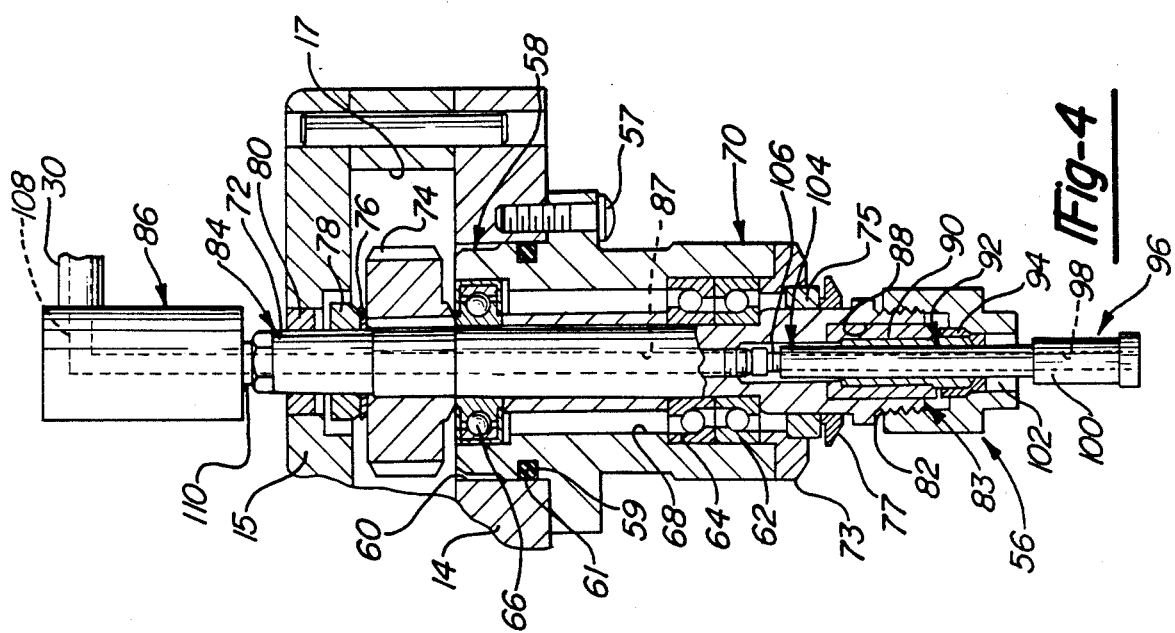
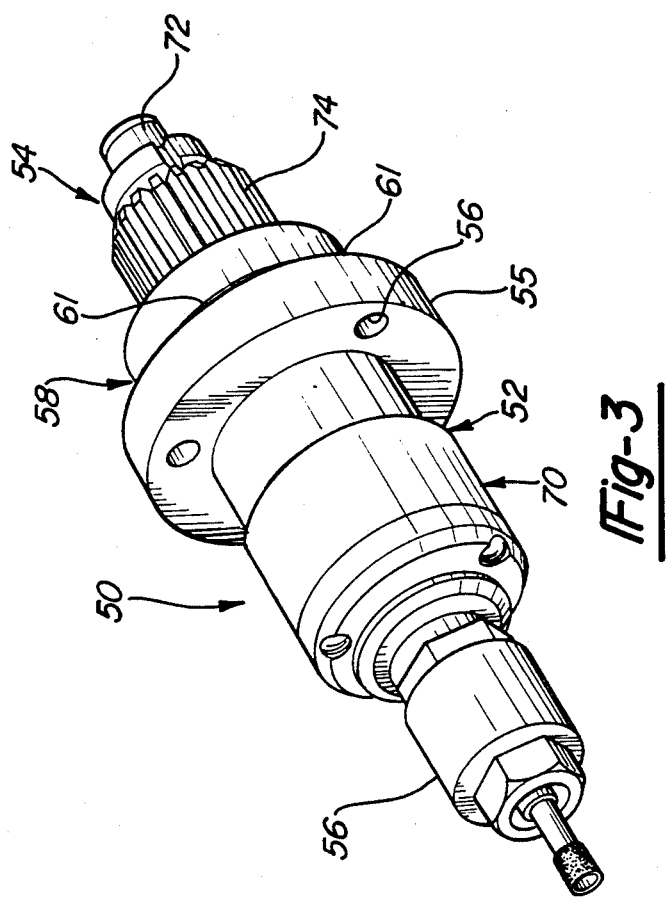

REMOVABLE SPINDLE FOR DRILL HEADS

BACKGROUND AND SUMMARY OF THE INVENTION

The present invention relates to drill head spindles and, more particularly, to drill heads having removable spindles for boring holes in glass or the like.

At the present time, glass, particularly automotive glass, is drilled with by a top and bottom set of drill head spindles. The glass is positioned between the drill heads with the spindles and drill bits opposing one another. The press is closed causing the two heads to come together enabling the drill bits to bore holes from both directions approximately half way through the glass. Upon opening of the press, the slug is removed and holes are formed in the glass.

The most common problem experienced in the field today is spindle failure. The spindles rotate along with the bits and, thus, take the most abuse. In the current art drilling machines when a spindle fails, the entire drill head must be removed from the press and repaired. Generally, the repair involves replacing bearings, seals and often the spindle shaft. In order to remove the spindles from the drill head, the coolant couplings, lubrication lines and coolant hoses must be removed from the drill head so that the drill head cover may be unscrewed and separated from the spindle housing. Often, after the housing has been opened the gear train must be dismantled and new bearings and seals replaced.

The spindles are removable from the inside out, which necessitate the removal of the entire spindle drill head. Once the spindles are replaced, the cover is put back on the spindle housing and the lubrication lines, coolant lines and coolant couplings are replaced onto the spindles for use.

This above-described procedure generally takes several hours. The drill heads must be positioned back on the press and aligned. The aligning must be precise so that the sets of spindles of the drill heads directly oppose one another. Often times this procedure results in 10 to 20 hours of lost production time which hampers production of the window glass.

Relevant art is illustrated in the following U.S. patents. The patents are Padovani U.S. Pat. No. 4,579,483, issued Apr. 1, 1986; Miyakawa U.S. Pat. No. 4,365,916, issued Dec. 28, 1982; Wood U.S. Pat. No. 4,280,775, issued July 28, 1981; Highberg et al U.S. Pat. No. 3,828,479, issued Aug. 13, 1974; Hart et al U.S. Pat. No. 3,765,787, issued Oct. 16, 1973; Evans U.S. Pat. No. 3,555,963, issued Jan. 19, 1971; Ferguson et al U.S. Pat. No. 3,461,615, issued Aug. 19, 1969; Conrad U.S. Pat. No. 3,090,412, issued May 21, 1963; Mezey U.S. Pat. No. 2,703,994, issued Mar. 15, 1955; and Karge U.S. Pat. No. 2,437,605, issued March 9, 1948.

It is an object of the present invention to overcome the disadvantages of the above art. The present invention provides the art with drill heads having removable spindles. The spindles can be easily removed from the drill heads without causing extended line downtime. Also, the present invention eliminates realignment of the drill head since only the spindles are removed from the drill head and not removal of the entire drill head. The present invention provides the art with a universal spindle that can be positioned into a drill head as an off-the-shelf item. The present invention provides the art with a spindle which enables coolant to pass directly through the spindle onto the workpiece. The present invention is of a waterproof construction.

From the following description and claims taken in conjunction with the accompanying drawings, other objects and advantages of the present invention will become apparent to one skilled in the art.

BRIEF DESCRIPTION OF THE DRAWINGS

FIG. 3 is a perspective view of a spindle in accordance with the present invention.

FIG. 4 is a partial cross-section view of FIG. 1 along line 4—4 thereof.

DETAILED DESCRIPTION OF THE PREFERRED EMBODIMENT

Figure 1:
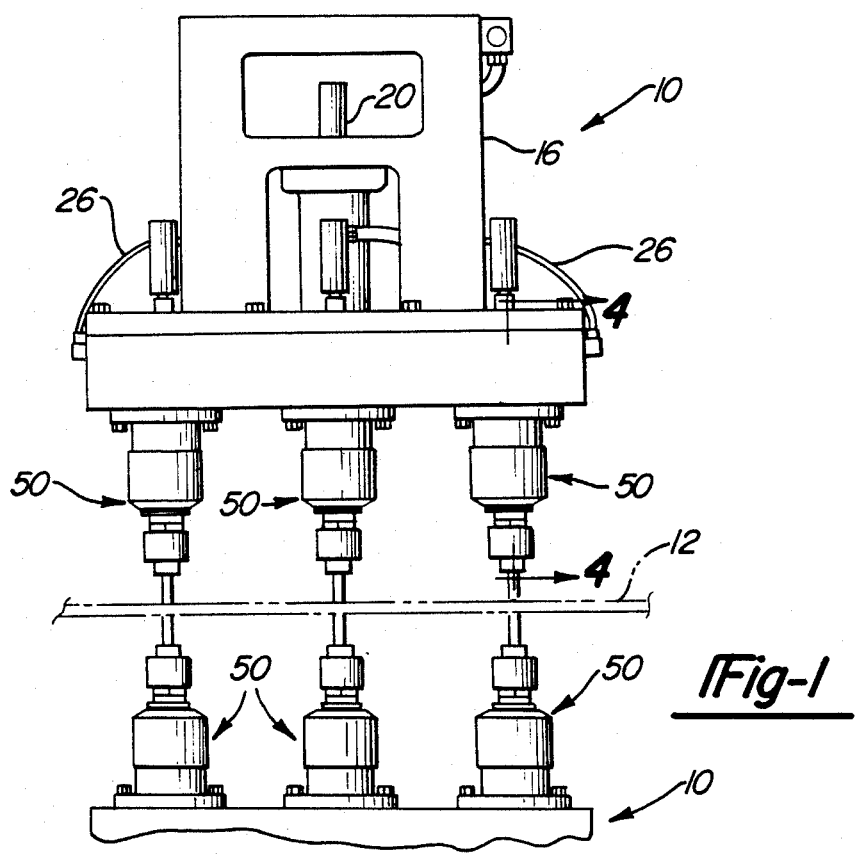
FIG. 1 is a side view in elevation of a drill head set in accordance with the present invention.
Figure 2:
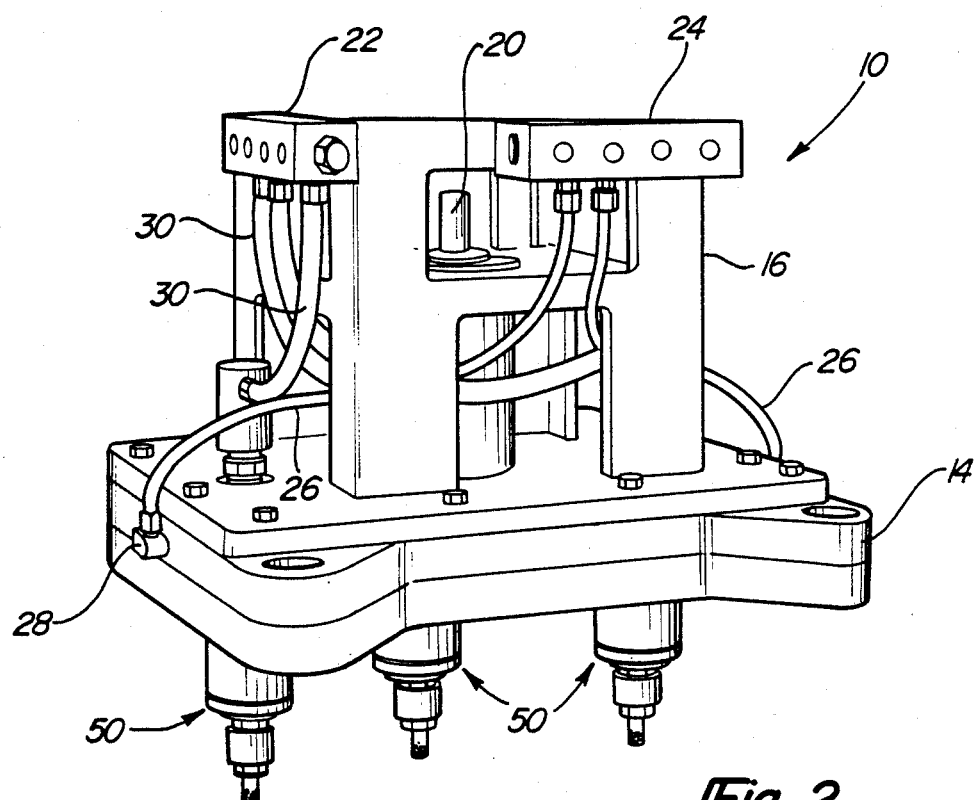
FIG. 2 is a perspective view of the drill head in accordance with the present invention.

Referring to the figures, particularly FIGS. 1 and 2, drill heads are shown and illustrated with the reference numeral 10. The drill heads 10 include a plurality of spindles 50. A glass panel 12 to be drilled is positioned between opposing spindles 50 in FIG. 1.

Figure 5:
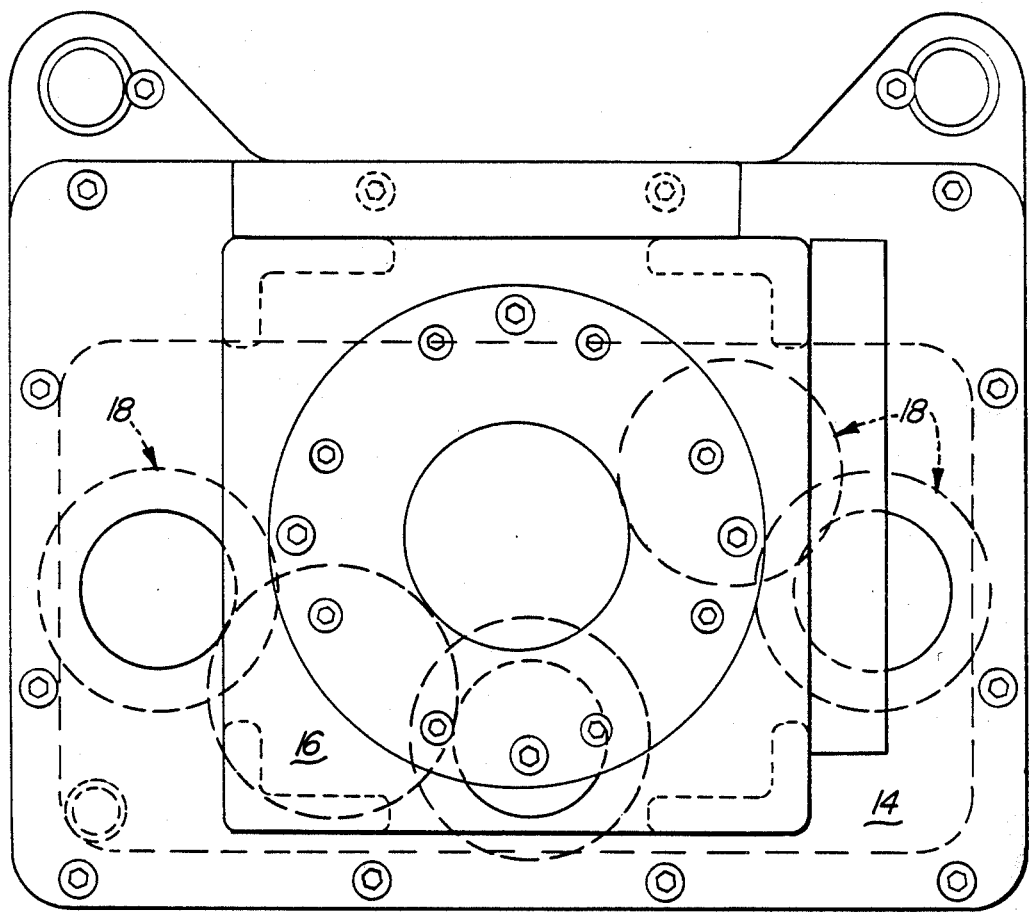
FIG. 5 is a top plan view of the drill head in accordance with the present invention.

The drill heads 10 include a single deck 14 and a mounting member 16. The single deck 14 includes a gear train 18 positioned within the single deck 14, as can be seen in phantom in FIG. 5. A driver 20 drives the gear train 18 which in turn rotates the spindles 50. A coolant manifold 22 and lubricant manifold 24 are mounted to the mounting member 16.

The lubricant manifold 24 includes several lubricant lines 26 having fittings 28 which couple them to the single deck 14. Lubricant is provided through the manifold 24 into the single deck 14 for lubricating the gear train 18. The coolant manifold 22 has a plurality of lines 30 coupled with the spindles 50, which will be explained herein.

Turning to FIG. 3, a detailed perspective view of a spindle 50 is shown. The spindle 50 includes a body member 52, a shaft member 54 and a chuck mechanism 56.

The body member 52 has an overall elongated cylindrical shape. The body member 52 includes a radial flange 55. The radial flange 55 has a plurality of bores 56 to enable fasteners 57 to pass therethrough to removably secure the body member 52 to the single deck 14, as seen in FIGS. 1 and 4. A first portion 58 of the body member 52 extends into a bore 60 in single deck 14 to couple the spindle body member 52 within the single deck 14.

The first portion 58 includes a peripheral groove 59. An O-ring seal 61 is positioned within the groove 59. The O-ring seal 61 provides a liquid tight seal between the first portion 58 and the single deck 14.

A plurality of sealed bearings 62, 64 and 66 are positioned within an axial bore 68 in the body member 52. Sealed bearings 62 and 64 are positioned in a second portion 70 of the body member 52. The sealed bearings 62 and 64, while enabling the shaft 54 to rotate within the body member 52, also prevent fluid from entering into the body member 52. Sealed bearing 66 is positioned in the axial bore 68 in the first portion 58 of the body member 52. The sealed bearing 66 likewise enables the shaft member 54 to rotate within the body 52 while preventing fluid from entering into the body member 52.

The shaft member 54 includes a shaft 72 and a sprocket 74. The sprocket 74 rotatably couples the shaft 72 with the drive train 18. The sprocket 74 is retained on the shaft 14 by lock washer 76 and lock nut 78. A seal 80 seals the shaft 72 with the upper plate 15 of the single deck 14. The seal 80 prevents lubricants from escaping from the cavity 17 within the single deck 14.

A retaining cap 73 is positioned in the axial bore 68 at the end of the second portion 70 of the body member 52. The cap 73 positions bearings 62 and 64 within the body member 52. An oil seal 75 may be positioned in the retaining cap 73. The oil seal 75 is positioned about the periphery of shaft 72 to lubricate the shaft 72 as it rotates. A second cap 77 retains the oil seal 75 within the retaining cap 73.

The shaft 72 has two ends. One end 83 includes a threaded member 82 for securing the chuck mechanism 56 onto the shaft 72. The other end 84 includes internal threads for enabling a coolant fixture 86 to be coupled with the shaft 72.

The shaft 72 includes an axial bore 87 passing through the shaft 72. The axial bore 87 includes an enlarged portion 88 towards the end 83 of the shaft 72. A collet insert 90 is positioned in the enlarged portion 88 of the axial bore 86. A collet 92 is positioned within the collet insert 90. A nose ring 94 is positioned preferably about an end of the collet 92. The chuck 56 along with the nose ring 94 and collet 92 operate together to lock the drill 96 within the shaft 72.

The drill 96 includes an axial bore 98 through its head 100 and shaft 102. The head 100 is generally covered with a diamond dust or the like for drilling through the glass panel 12.

Generally, the drill shaft 102 includes an interior threaded portion at one of the ends 104 to enable a threaded nipple 106 to connect the drill 96 with the shaft axial bore 86. The shaft axial bore 87 includes a threaded portion to accept nipple 106 to enable a continuous axial bore path through the shaft 72 and the drill 96.

The coolant fitting 86 includes a fluid path 108 passing therethrough. The fluid path 108 is coupled with the conduits 30 to enable coolant to pass from the manifold 22 into the spindle 50. The fitting 86 includes a threaded nipple 110 for securing the fitting 86 into an internal threaded bore on the shaft end 84.

Thus, coolant may pass from the manifold 22 through the conduit 30 into the fitting 86. The coolant continues to pass through the fitting 86 into the axial bore 87 of the shaft 72. The coolant passes through nipple 106 into the drill 96. Fluid passes out through the drill 96 onto the panel 12 being bored. The fluid path provides a sufficient amount of coolant to cool the surface while it is being drilled. Thus, coolant is passed directly through the spindle onto the workpiece during the drilling operation of the spindle.

While the above detailed description describes the preferred embodiment of the present invention, it will be understood that modifications, variations and alterations may be made to the present invention without deviating from the scope and fair meaning of the subjoined claims.

What is claimed is:

1. A spindle for a glass drilling unit including one or more decks with a gear train within said one or more decks and a driver for rotating the gear train comprising:

a body member;
means adapted for removably coupling said body member, said removable coupling means coupled with one of the decks of said glass drilling unit;
shaft means adapted for receiving and rotating a drill, said shaft means removably, rotatably coupled with the gear train of said drilling unit; and
means adapted for providing a coolant to a workpiece, said means for providing a coolant directly coupled with said spindle shaft means.

2. The spindle according to claim 1 wherein said means for removably coupling said spindle includes a flange on said body and fastening means for securing said body to said drilling unit.

3. The spindle according to claim 1 further comprising a sprocket coupled with said shaft means for rotatably coupling said shaft with a gear train of said drilling unit.

4. A spindle adapted for use in a glass drilling unit including one or more decks with a gear train within said one or more decks and a driver for rotating the gear train comprising:

a body member;
means adapted for removably coupling said body member, said removable coupling means coupled with one of the decks of said glass drilling unit;
shaft means adapted for receiving and rotating a drill, said shaft means adapted to be removably rotatably coupled with the gear train of said drilling unit; and
means for providing a coolant to a workpiece, said means for providing a coolant integrally coupled directly with said shaft means such that said coolant is passed through said shaft means and ejected onto said workpiece.

5. The spindle according to claim 5 further comprising sealed bearing means for enabling rotation of said shaft means in said body member and for preventing said coolant from entering said body member.

6. The spindle according to claim 4 wherein said shaft means includes an elongated shaft having two ends, one of said ends adapted to receive said drill and the other of said ends adapted to receive a coolant fitting, and a sprocket coupled with said shaft adapted for rotatably coupling said spindle with a gear train of said drilling unit.

7. The spindle according to claim 6 wherein said means for providing said coolant includes an axial bore in said shaft.

8. The spindle according to claim 7 wherein said drill includes an axial bore for enabling said coolant to pass through said drill onto said workpiece.

9. A drill head comprising:
one or more decks;
a gear train within said one or more decks;
a driver for rotating said gear train; and one or more spindles removably coupled with said one or more decks, each of said spindles including:
a body member;
means for removably coupling said body member with said one or more decks;
shaft means for receiving and rotating a drill, said shaft means including means for removably rotatably coupling said shaft means with said gear train; and
means for providing a coolant to a workpiece, said means for providing a coolant integrally coupled directly with said shaft means such that said coolant is passed through said shaft means and ejected onto said workpiece.

10. The drill head according to claim 9 wherein one or more said spindle body members have an overall elongated cylindrical shape having two ends, one of said ends associated with said one or more decks and the other of said ends projecting from said one or more decks such that the distance from the projecting end to the one or more decks is constant.

11. The drill head according to claim 9 further comprising sealed bearing means for enabling rotation of said shaft means in said body member and for preventing said coolant from entering said body member.

12. The drill head according to claim 9 wherein said shaft means includes and elongated shaft having two ends, one of said ends adapted to receive said drill and the other of said ends adapted to receive a coolant fitting, and a sprocket coupled with said shaft for rotatably coupling said spindle with said gear train.

13. The drill head according to claim 9 wherein said means for providing said coolant includes an axial bore in said shaft.

14. The drill head according to claim 9 wherein said drill includes an axial bore for enabling said coolant to pass through said drill onto a workpiece.

* * * * *